Jan. 7, 1936.  W. H. DUMBLE  2,026,778

FISHING TOOL

Filed Feb. 8, 1935

INVENTOR,
W. H. Dumble;
BY J. E. Maynard,
ATTORNEY.

Patented Jan. 7, 1936

2,026,778

UNITED STATES PATENT OFFICE 2,026,778

FISHING TOOL

William H. Dumble, Bakersfield, Calif., assignor of one-half to Samuel J. Checchi, Bakersfield, Calif.

Application February 8, 1935, Serial No. 5,571

5 Claims. (Cl. 294—95)

This invention is a fishing tool of the class used in the well drilling art and of the type employing a set of hooks or grabs operative to close upon the obstacle, in the well hole, which is to be recovered from the hole to save its abandonment, if possible.

Such tools are employed in a very expensive and heavy drill stem composed of tubular sections which are screwed together by right hand screw joints. Present fishing tools are so constructed and operated that either the closing or the opening operation of the tool grabs is accomplished by turning the drill stem to the left and this involves the very serious hazard of one or more of the stem joints becoming unscrewed with the result that all of the stem below the loose joint may be dropped. This event entails the delay and cost of fishing for the dropped stem part as well as the probability of losing the hole because of the very nature of the new fish.

Wherefore, the primary object of the instant invention is to provide a fishing tool whose grabs are either opened or closed by operation of the drill table in one and the same direction, that is, in standard practice, to the right in accordance with the joint screw.

A further object is to provide a fishing tool whose opposite functions of opening or closing the grabs can be accomplished with the minimum attention of the drill crew, that is, requires but very little actual watchfulness by the drillers and thus facilitates the fishing job by reducing mental strain of the crew in fear of miscarriage of the fishing expedition.

Another purpose of the invention is to provide a tool which by reason of its simple operative steps will greatly facilitate the working of the fish up into the axis of the hole for ultimate extraction.

And a desideratum is to provide a tool of this class which is substantial, reliable and highly efficient.

The invention consists of certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, spirit and principle of the invention as it is more directly claimed hereinbelow. It is understood that the functional use of the apparatus of this disclosure in any other art than that herein set forth is deemed to be within the adaptation of the invention.

Figure 1:
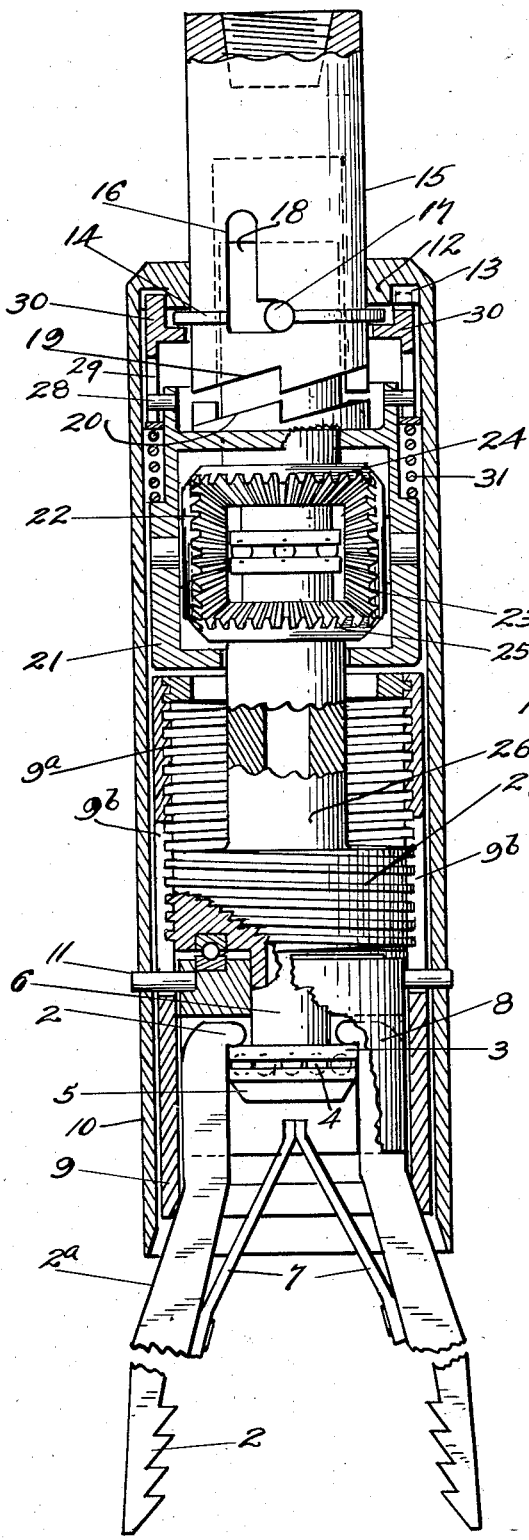
Figure 1 is an axial section of the tool.
Figure 2:
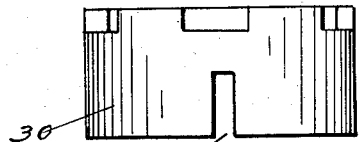
Figure 2 is a side elevation of the gear box lock ring.
Figure 3:
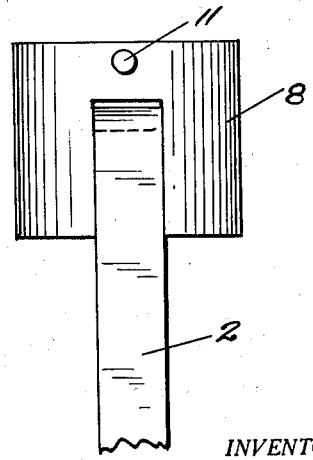
Figure 3 is a side elevation of the grab yoke.

A pair of opposed, toothed grabs or hooks 2 is pivotally suspended from an anti-friction, hanger race 3 of a set of bearing balls 4 running on a race 5 which is fixed to the lower end of a hanger stem 6; the grabs 2 being normally spread by a spring device 7.

The upper ends of the grabs 2 are laterally confined in and by a yoke 8, through which the stem 6 rotatively extends, telescopically fitting in a tubular member 9 whose lower end engages and constitutes a contractor for the open grabs whose divergent edges 2a are wedged inward by descent of the contractor 9.

Surrounding the contractor 9 is a cylindrical shell 10 connected to the yoke 8 as by pins 11 projecting therefrom through the tubular contractor and supporting it; the yoke being hung on the hanger race 3 on the stem 6. The upper end of the shell 10 is provided with an internal flange 12 which is undercut to form a system of teeth 13 and overhangs a peripheral shoulder 14 which is rigidly provided on a drive head 15 whose upper end is threaded for positive connection to the adjacent end of a tool string (not here shown), and by which the head 15 may be rotated in either direction.

Broadly the present invention consists of means driven in one direction of turn of the head 15 to effect the closing or the opening of the grabs 2, thereby eliminating a turn of the stem and drive head 15 which is reverse to the usual stem screw thread and, so, preventing accidental disjointing of the drill stem.

To that purpose the drive head 15 has an L-slot 16 in whose horizontal foot lies a pin 17 fixed in a gear shaft 18 journaled in the axial bore of the head 15; this being tubular for mud circulation, as is the shaft 18. The slot 16 allows for a short right or left turn of the head 15 and permits the head to be lowered on the shaft 18, if the tool grabs are standing on the bottom of the hole in which the tool is lowered, or is resting on a fish.

Such downward movement of the head closes a clutch ring 19 provided thereon with a matching ring 20 which is fixed on a gear box or frame 21 turnably fitting in the shell 10 and turnably supporting opposite planetary gears 22—23 engaging coaxial gears 24—25, the former of which is fixed on the lower end of the gear shaft 18, and the latter of which is fixed to its shaft part 26; thus constituting a differential system whereby the shaft part 26 may be turned either left hand or right hand while the drive head 15 and gear 24 always has a right turn drive.

The gear shaft 26 is provided with a fixed screw 27 to which is fixed the above mentioned hanger stem 6 supporting the grabs 2; this whole device being tubular for circulation.

The screw 27 is in constant mesh with the internally threaded upper portion 9ª of the contracting member 9 and the latter can be run up or down at will by change of direction of rotation of the screw 27 by the reversing gear set.

In the position of the parts shown in Fig. 1, the box 21 is locked against rotation by a spline device as pin 28 engaged in slots 29 in a box lock ring 30 reciprocative in the upper part of the shell 10 to engage its top teeth 13 and resting on an expansion spring 31 supported on a shoulder of the box 21.

If it is desired to close the grabs 2 the head 15 is now turned a little to the left to shift the pin slot so that the pin 17 comes under the vertical part of the slot 16. Then the head is lowered so that the shoulder 14 engages ring 30 and this is unlocked from the shell teeth 13, and the drive clutch ring 19 of the head 15 meshes with the opposite ring 20 of the gear box 21. From this it follows that the gear system will turn as a unit, right hand, with the driving head 15, if this be now turned to the right (the pin 17 being in the leg of the slot 16). With the gear set turning right hand the left hand screw 27 will run the contractor 9 down and contract the grabs 2 on a fish. It is understood that the direction of stem and gear turn is in reference to the motion of the drill table.

If the grappled fish cannot be pulled by the first effort the grabs can be opened by again lightly landing the grabs and lifting and turning the stem head 15 right hand enough to shift the pin 17 to the toe of the slot 16. Then the stem and head are raised so that the flange or shoulder 14 engages the lock ring 30 and this is pulled up to its locking position with the shell teeth 13 and at the same time the drive clutch ring 19 of the head 15 disengages from the opposite ring 20 of the gear box 21, from which it follows that the gear 25 will be turned left hand by the driving head while this is now turned for the purpose of turning the screw 27 to the left and thus effect upward shift of the threaded contractor 9.

Recession of the contractor permits the spring 7 to open the grabs 2.

A skilled driller can tell by the feel of the tool and effort of work on the fish how best to employ the tool to its utmost capacity in working on the fish until it is found to be so presented or centered in the hole that it can be successfully drawn.

It will be seen from the above that the only left hand turn of the table needed is to shift the drive pin 17 from the toe of slot 16 in the drive head to permit closure of the gear clutch 19—20 after which the table is again turned to the right. And no material resistance is put on the tool string even when it is turned to the left.

The contractor 9 has longitudinal slots 9ᵇ receiving the yoke pins 11, which support the shell 10, and allowing for free reciprocation of the contractor by its actuating screw.

What is claimed is:

1. A fishing tool of the class described including a set of grabs, a driven head, means including a shell suspensively connecting said grabs and said head and including mechanism for closing the grabs and controlling the opening thereof, a non-shiftable gear means which is operative on said mechanism by said head without changing the direction of head rotation to secure either closing or opening of the grabs, and clutch means interposed yieldably between the shell and the gear means to connect or disconnect the gear means as to the shell.

2. A steam driven head, a shell connected to the head, a gear set in the shell including a box having a clutch means relatively shiftable on the box to interlock with the shell, a clutch device for connecting the head and said set at will, a contractor actuated by the gear set during its rotation in either direction whilst the head is turning unidirectionally; and a set of grabs carried by the shell and controlled by the gear set.

3. A stem driven head, a shell attached to the head, a gearing, a clutch means slidably attached to the gearing and interlockable with the shell to hold the gearing against rotation as a unit in the shell, a clutch device to interlock the head and the gearing as a unit, a screw sleeve slidably connected to the shell against relative rotation, a set of grabs hung in the shell and closable by the sleeve, and screw means engaging the sleeve and turnable in either direction by the gearing, whilst the drive head is turning unidirectionally, to shift the sleeve to release or to close the grabs.

4. A structure as set forth in claim 2 and in which the drive head is connected to the gearing by a device providing for relative axial shift of the head and the shell and for slight relative turn of the head as to the gearing and for securing the parts in one position against axial shift; whereby to disconnect the clutch means from the shell at will.

5. A fishing tool of the class described including a set of grabs, means to open the grabs and means to close the grabs, a rotative drive head, gear means acting on the closing means and operative by and without change of rotation of the said head to determine closing or opening of the grab actuating means, a shell suspended by the said head and a clutch shiftably connected to the gear means and engageable with the shell to control the gear means.

WILLIAM H. DUMBLE.